United States Patent
Berglund et al.

(10) Patent No.: US 6,885,928 B2
(45) Date of Patent: Apr. 26, 2005

(54) METHOD AND DEVICE FOR SHIFTING OF A GEARBOX

(75) Inventors: Sixten Berglund, Torslanda (SE); Anders Eriksson, Göteborg (SE)

(73) Assignee: Volvo Lastvagnar AB, Göteborg (SE)

(*) Notice: Subject to any disclaimer, the term of this patent is extended or adjusted under 35 U.S.C. 154(b) by 0 days.

(21) Appl. No.: 10/708,216

(22) Filed: Feb. 17, 2004

(65) Prior Publication Data

US 2004/0260443 A1 Dec. 23, 2004

Related U.S. Application Data

(63) Continuation of application No. PCT/SE02/01462, filed on Aug. 16, 2002, now abandoned.

(30) Foreign Application Priority Data

Aug. 17, 2001 (SE) .............................................. 0102748

(51) Int. Cl.$^7$ ............................................. B60K 41/04
(52) U.S. Cl. ........................... 701/51; 701/60; 475/118
(58) Field of Search .............................. 701/51, 54, 55, 701/59, 60, 61, 64, 101, 102, 110, 67, 68; 477/115, 118, 119; 475/116, 118, 122

(56) References Cited

U.S. PATENT DOCUMENTS

| 4,740,898 A | * | 4/1988 | McKee et al. ................. 701/70 |
| 5,157,608 A | * | 10/1992 | Sankpal et al. ............... 701/58 |
| 5,287,773 A | | 2/1994 | Nakawaki et al. |
| 5,609,548 A | | 3/1997 | White et al. |
| 5,612,878 A | * | 3/1997 | Joao et al. ............... 455/456.1 |
| 5,733,219 A | | 3/1998 | Rettig et al. |
| 5,910,069 A | * | 6/1999 | Markyvech ................. 477/109 |
| 6,584,391 B1 | * | 6/2003 | Lack ........................... 701/51 |

FOREIGN PATENT DOCUMENTS

EP        0925990 A2    6/1999

* cited by examiner

*Primary Examiner*—Richard M. Camby
(74) *Attorney, Agent, or Firm*—Novak Druce & Quigg LLP

(57) ABSTRACT

The invention relates to a method for up-shifting of an automatic or semiautomatic gearbox which is connected to an engine equipped with an additional engine brake, which method comprises determining an expected value of the speed derivative ($ESG_e$) of said engine during said gear-shifting. The invention is characterized in that said method comprises measuring the speed derivative ($ESG_m$) of the engine during said gear-shifting (21), calculation of a difference value which corresponds to the difference between the measured value of the speed derivative ($ESG_m$) and the expected value of the speed derivative ($ESG_e$), and updating the expected value of the speed derivative ($ESG_e$) to a new value which more closely corresponds to said measured value of the speed derivative ($ESG_m$) if said difference value exceeds a predetermined threshold value (x). The invention also relates to a device for such engine braking. By means of the invention, an adaptation of a parameter is obtained regarding the speed derivative of the engine during a gear-shifting process so that gearshifts can be carried out with optimal performance of the engine.

9 Claims, 4 Drawing Sheets

METHOD AND DEVICE FOR SHIFTING OF A GEARBOX

CROSS REFERENCE TO RELATED APPLICATIONS

The present application is a continuation patent application of International Application No. PCT/SE02/01462 filed 16 Aug. 2002, now abandoned which was published in English pursuant to Article 21(2) of the Patent Cooperation Treaty, and which claims priority to Swedish Application No. 0102748-1 filed 17 Aug. 2001. Both applications are expressly incorporated herein by reference in their entireties.

BACKGROUND OF INVENTION

1. Technical Field

The present invention relates to a method for up-shifting of an automatic or semiautomatic gearbox which is connected to an engine equipped with an auxiliary engine brake, which method comprises determining an expected value of the velocity derivative of said engine during said gear-shifting.

The invention also relates to a device for up shifting of an automatic or semi-automatic gearbox which is connected to an engine equipped with an auxiliary engine brake, comprising a control unit for initiating gear-shifting and for storing an expected value of the velocity derivative of said engine during said gear-shifting.

2. State of the Art

Commercial vehicles, such as trucks and buses, are normally equipped with an engine brake function to spare the wheel brakes of the vehicle during braking. In this context, it is previously known to provide an engine braking effect in an internal combustion engine by means of arranging a choke organ, for example in the form of a valve, in the exhaust system of the vehicle. In this manner, a certain portion of the work during the exhaust stroke of the piston can be used to increase the braking effect.

Another kind of engine brake is a so-called compression brake, which operates by means of choking one or more of the exhaust valves of the engine so that the air which been compressed during the compression stroke of the engine in the combustion chamber is partially allowed to flow out into the exhaust system. This means that part of the compression work carried out during the compression stroke is not re-used during the expansion stroke of the engine, which is utilized for a braking effect on the crank shaft.

In a known compression brake the exhaust valves are controlled in such a manner that the camshaft of the engine is given a profile which is shaped with at least one extra ridge in order to achieve an opening of the exhaust valves to generate braking effect. Also, the valves are shaped with a small play, the size of which is chosen (together with the dimensions of the extra ridge), so that the extra ridge does not effect the valves during normal engine operation. For this purpose, the extra ridge has a lifting height which is very small compared to the regular exhaust ridge. In order to make the extra ridge operable during engine braking, i.e. so that the exhaust valves can be opened when engine braking, each rocker arm is shaped with a device in the form of a displaceable piston which is effected by oil to be placed in a protruding position. This causes the valve play to be eliminated, and the lifting height of the extra ridge then becomes sufficient to open the exhaust valves.

Apart from utilizing an engine braking device for braking the vehicle as such, i.e. as a complement to the wheel-brakes of the engine, there is also a desire to use an engine braking device, such as for example a compression brake, during shifting of the gearbox of the vehicle. It can here be seen that commercial vehicles such as trucks and buses are more and more frequently equipped with automatic or semiautomatic gearboxes. Such gearboxes can be likened to conventional manual gearboxes, with the difference that the gear-shifting is carried out by means of maneuvering devices instead of manually by driver. The appended FIG. 1 shows the principal phases in connection with an up-shifting (i.e. to a higher gear) in such a gearbox. FIG. 1 shows a comparison between engine torque and engine speed relative to time in a given type of engine.

As can be seen in FIG. 1, phase "a" shows a normal driving condition before a gearshift is initiated. Phase "b" shows the removal of the engine torque as soon as the decision has been made to carry an up-shift. Phase "c" shows the release of a claw coupling in order to decouple the gearbox from the engine. Phase "d" shows a decrease of the engine speed in order to match the engine speed to the gear ratio that is to be chosen. As soon as the engine speed has decreased sufficiently, the new gear can be engaged. Thus, phase "e" shows the engagement of the new claw coupling. Phase "f" shows the restoring of the torque, and phase "g" shows a normal driving condition after the gear-shifting has taken place.

In order to reduce the loss of driving energy of the vehicle during an up-shift, it is advantageous if the engine speed can be matched to the new gear ratio as rapidly as possible. From document SE-C-502154 it is known to selectively use an exhaust brake during up-shift when certain operational parameters are achieved in order to thus obtain a rapid decrease of the engine speed during the gear-shifting process. In this way the wear on the exhaust brake system allegedly decreases, since the use of the exhaust brake is only carried out during a small portion of the total amount of up-shifts.

From Swedish patent application number 9804439-9, an arrangement is previously known for engine braking in connection to an internal combustion engine. This arrangement is adapted for engine braking by means of decreasing the engine speed when shifting gears, and for this purpose comprises a special device which is sensitive to a signal which is generated as an answer to a need to obtain a gearshift and in order to obtain an absorption of a valve play in a rocker arm.

When shifting gears in an engine, there is generally a desire for the time for the power cut-off, PCOT of the engine, to be made as small as possible. According to prior art, there is during gear-shifting generated first a signal that indicates that the gear-shifting is going to take place. After initiating the gear-shift and removing the engine torque, the rpm of the engine will successively decrease, mainly due to friction forces in the moving parts of the engine. Finally, a lower rpm will have been reached at which the gear-shifting can be completed. In order to additionally shorten the power cut-off time during gear-shifting engine, braking can also take place, as has been mentioned above.

A further desire in connection to gear-shifting is that the gear-shifting process should always take place while maintaining optimal parameters of the engine and the rest of the vehicle. Carrying out a gearshift can be affected by a number of parameters, such as the slope of the road, the air and rolling resistance of the vehicle etc, and there are naturally demands to, as far as possible, avoid incomplete gear-shifting and other main functions. If, for example, the power cut-off time is too long, it can be difficult to carry out gearshifts at all, which causes the engine to stop. Another difficulty which can arise is that different engine combinations and different vehicles can exhibit slight variations regarding performance and function including the engine brake function. This means that, for example, gear-shifting can be carried out during somewhat different conditions on different vehicles. There is thus a need to compensate for such individual variations that can influence the gear-shifting.

SUMMARY OF INVENTION

A purpose of the present invention is to provide engine braking during gear-shift in an automatic or semi automatic gearbox which contributes to a reliable gear-shifting process.

This objective is achieved according to the present invention by means of the method according to amended claim 1, in more detail by a method of the initially mentioned kind which is characterized in that it comprises measuring the speed derivative of the engine during said gear-shifting, calculating a difference value which corresponds to the difference between the measured value of the speed derivative and the expected value of the speed derivative, and updating of the expected value of the speed derivative to a new value which more closely corresponds to said measured value of the speed derivative if said difference value exceeds a predetermined threshold value.

This objective is also obtained according to the present invention by means of the device according to appended claim 9, in more detail a device of the initially mentioned kind, which is characterized in that it comprises means for measuring the speed derivative of the engine during said gear-shifting with said control unit being arranged to calculate a difference value which corresponds to the difference between the measured value of the speed derivative and the expected value of the speed derivative, and for updating of the expected value of the speed derivative to the expected value of the speed derivative to a new value which more closely corresponds to said measured value of the speed derivative if said difference value exceeds a predetermined threshold limit.

By means of the invention, certain advantages are obtained. Primarily, it can be noted that the invention permits the adaptation of a parameter referring to the speed derivative of the engine during a gear-shifting process so that gear-shifting can be carried out while the engine is being driven with optimal performance.

By means of the adaptation, a compensation is also enabled for individual variations of different engines and engine combinations, so that an equivalent engine braking function can be obtained even in the case of minor variations between various engines.

The invention will also be able to compensate for the effects of, for example, change of engine oil that can cause individual variations between different engine arrangements. This advantage of the invention is particularly significant since the times for oil change in different vehicles cannot be predicted.

Advantageous embodiments of the invention will become apparent from the appended dependent patent claims.

BRIEF DESCRIPTION OF DRAWINGS

The invention will in the following be explained more closely with reference to an example of a preferred embodiment and the appended drawings in which.

DETAILED DESCRIPTION

Figure 1:
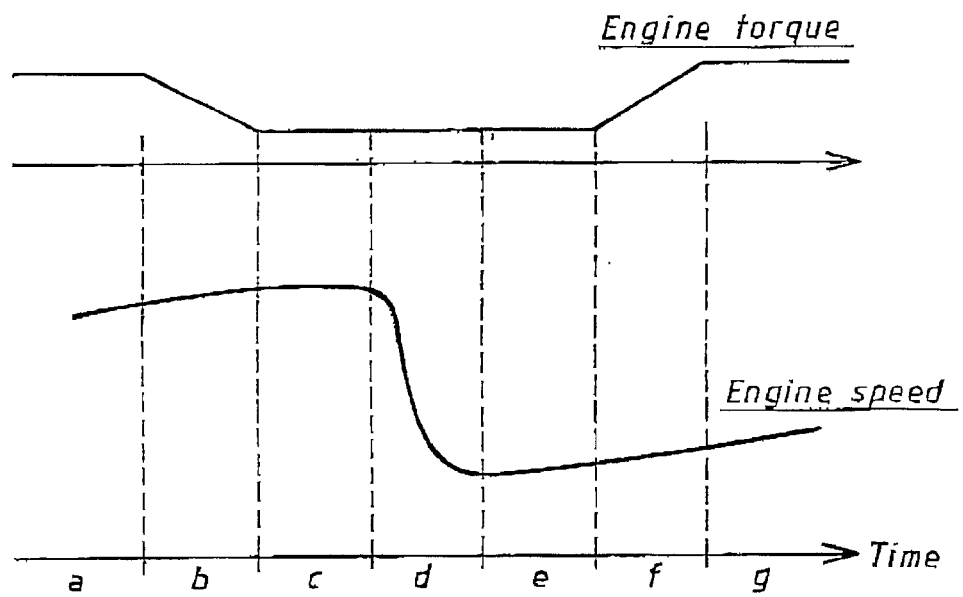
FIG. 1 shows a graphical representation of the principle phases during up-shifting in a gearbox, FIG. 2 schematically shows a device for absorbing engine play in an engine braking device of the compression brake kind, FIG. 3a schematically shows the function of an engine during gear-shifting with the rpm of the engine varying according to a first process, FIG. 3b schematically shows the function of an engine during gear-shifting with the rpm of the engine varying according to a second process.

As previously mentioned, FIG. 1 shows the principle phases during up-shift (i.e. to a higher gear) in the kind of gearboxes which shift gear with a power cut-off occurring, as is common in commercial vehicles. FIG. 1 shows a comparison between engine torque and engine speed relative to time. Phase "a" shows a normal driving condition before a gear-shift is initiated. Since phase "a" is before the up-shifting, the engine speed will normally increase during this phase. Phase "b" shows the removal of the torque as soon as it has been decided that an up-shift is to take place. Removal of the torque necessitates matching the rotational speeds of the outgoing shaft from the engine and the ingoing shaft of the gearbox, and can be influenced in a plurality of manners depending on the operational conditions of the vehicle in which the gearbox is located. Phase "c" shows the release of a (not shown) claw coupling in order to release the driving line of the engine. In this phase, the fuel supply to the engine is limited to prevent the engine speed from increasing. Phase "d" shows the decrease of engine speed to match the engine speed to the gear ratio which is to be chosen. It is primarily the time it will take to reach the desired engine speed which determines how quickly an up-shift can be carried out. As soon as the engine speed has been reduced sufficiently, the new gear can be engaged. Thus, phase "e" shows the engaging of the new claw coupling. Phase "f" shows the re-engagement of torque, and "g" finally shows a normal driving condition after the gear-shift has taken place.

In order to obtain the necessary decrease of engine speed during phase "d"(see FIG. 1), a special control valve device is preferably used, as will become apparent in the following. In this way, a relatively quick carrying out of a gear-shift is enabled.

The invention is particularly intended to be used in connection with gearboxes which are unsynchronized. Additionally, the invention is intended to be utilized in connection with a valve mechanism 1 as can be seen from FIG. 2. This valve mechanism is a modified version of the valve play absorbing mechanism of U.S. Pat. No. 5,193,497, the contents of which is included as a reference in this application. The function of the valve mechanism is also previously known from the Swedish patent application 9804439-9.

Figure 2:
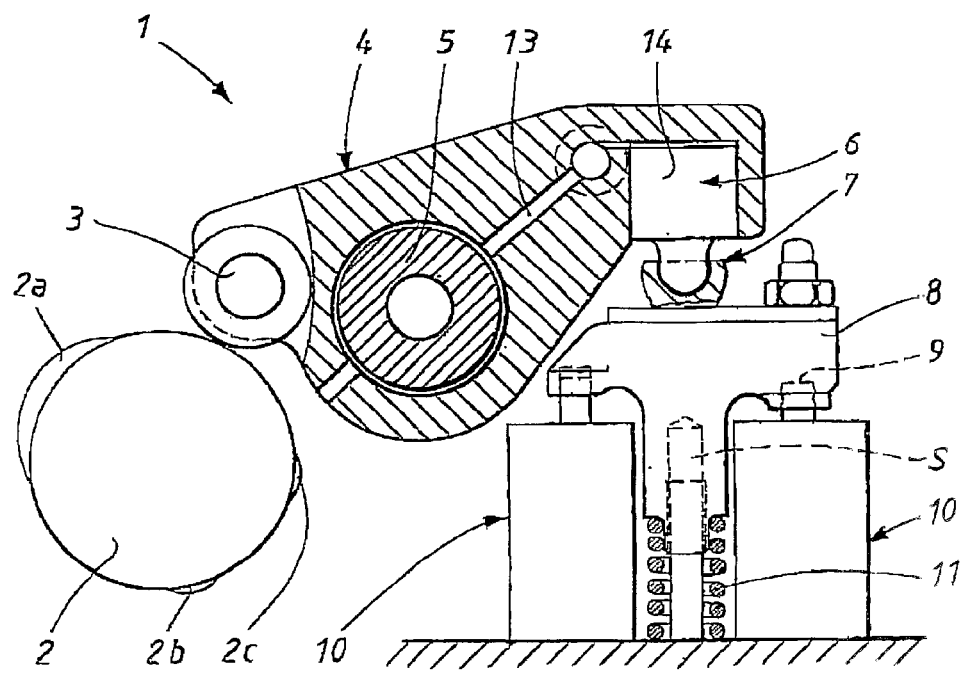

FIG. 2 thus shows a valve mechanism 1 for an internal combustion engine, with the valve mechanism 1 being suitable for use in connection with engine braking. The mechanism 1 comprises a cam shaft 2 which via a cylindrical roll 3 transfers a rotational movement to a rocker arm 4. The rocker arm 4 is arranged on a hollow rocker arm shaft 5 which is intended to be assembled on a not shown cylinder head in a suitable manner, for example by means of bolts. The rotational movement is transferred from the cam shaft 2 in a conventional manner via a transmission from the crank shaft of the engine (not shown).

The movement which is transferred from the cam shaft 2 to the rocker arm 4 is primarily controlled by a first ridge 2a which consists of an exhaust ridge for opening the exhaust valve at a suitable point in time. Furthermore, the cam shaft 2 has been given at least one, according to the embodiment two, extra ridges 2b, 2c, of which a first extra ridge 2b consists of a charging ridge which when activating an engine brake function has the purpose of opening the exhaust valve at the end of the inlet stroke of the engine, and to keep it open in the beginning of the compression stroke. The second extra ridge 2c is a decompression ridge which is placed along the cam shaft 2 so that it opens the exhaust valve at the end of the compression stroke. The lifting height of the extra ridges 2b, 2c is very small compared to the lifting height of the first normal ridge 2a.

In principle, the cam shaft can be arranged so that it can rotate in either direction. The two extra ridges 2b, 2c are shaped and dimensioned according to the chosen direction of rotation.

The movement of the rocker arm 4 is transferred via gear 6 and a semi-spherical control organ 7 to a yoke 8 which is displaceable along a guiding rail S on the cylinder head. In the embodiment shown, the yoke 8 effects two valve pipes 9. Each valve pipe is in a conventional manner surrounded by a valve coil 10. Apart from these two valve coils 10, there is a coil 11 arranged below the yoke 8. The purpose of this coil is to maintain the yoke in such a position that the play which always occurs in a valve mechanism of this kind will occur between the valve pipes 9 and the lower side of the yoke 8.

The above described valve mechanism can be supplied with pressurized oil which is fed to the cavity in the rocker arm shaft 5 by means of a suitable control valve device. Such a device as such is previously known from the Swedish patent application 9804439-9, and will for that reason not be described in detail below. It can however be mentioned that the known control valve device is arranged to supply oil at a suitable pressure to the rocker arm shaft 5 by means of control from a control system (not shown), which in turn can comprise, for example, an engine control unit and a transmission control unit. The control by means of the control system is then arranged to initiate activation of the control valve device when the gear-shifting takes place. During such initiation of the gear-shifting, pressurized oil will be supplied into the rocker arm shaft 5 and further along a conduit 13 in each rocker arm 4. The oil will then influence the gear 6 arranged at the end of the rocker arm above the valve tubes 9. The gear 6 suitably consists of a piston 14 which is active in two positions, and is moveable between these positions, which are a drawn-in position and an extended position. During normal operational conditions, oil is fed to the rocker arm shaft 5 at approximately 1 bar. During such pressure conditions, the piston 14 is kept in its in-drawn position by means of the spring 11 which effects the yoke 8.

When additional braking effect is needed, the above-mentioned control system instructs the control valve device to feed oil to the rocker arm shaft 5 under a higher pressure, for example at 2 bar. In this way, a braking effect is obtained since the piston 14 assumes its extended position at which valve play is absorbed. It is thus as such previously known to utilize a controllable valve to obtain engine braking effect when gear-shifting is initiated.

To indicate that a gear-shifting is to take place, the control system can utilize a plurality of various parameters (separately or in combination), for example signals referring to the rpm and torque of the engine, the speed of the vehicle and the current positions of the pedals of the vehicle. The invention is however not limited to implementation with these signals alone, but can be utilized with other signals as well, which gives an indication that gear-shifting is necessary, and that an engine braking is thus eminent. After a gear-shifting has been carried out, the piston 14 in the rocker arm will again exhibit a valve play which corresponds to engine braking no longer being obtained. In this way, the engine braking stops and the engine torque can be re-engaged.

The present invention will now be described in detail. Above, it has been mentioned that there is a need to not just shift gears as quickly as possible, but that such a gear-shift should also take place while maintaining optimal performance of the engine, the gearbox and the rest of the vehicle. These problems will now be described with reference to FIG. 3a which is a schematic diagram which shows the connection between time t (the x axis) and the rpm n of an engine (the y axis). From the schematic curves in the figure it can be seen that the gear-shifting of an engine is initiated by a transition from a first driving condition which is indicated with the reference numeral 15 to a second driving condition 16, with the first driving condition 15 being a normal operational condition which essentially corresponds to phase "a" according to FIG. 1 with the engine being able to be driven at a certain rpm $n_1$.

When a gear-shift is initiated, which is indicated with the reference numeral 17, the rpm of the engine n will gradually increase. The engine speed will then fall to a lower rpm $n_2$ which can be seen as a desired rpm at which the gear-shift in question can be carried out. The value of the desired rpm $n_2$ in turn depends on various outer circumstances, such as for example the slope of the road, the rolling resistance and the power cut-off time. If no engine brake function from, for example, the compression brake kind is utilized, the decrease rate of the rpm n will primarily be decided by the influence of the friction forces which work against the moving parts of the engine. If no active engine is utilized, the change from the first rpm $n_1$ to the second $n_2$ will thus take place during a certain period of time which in FIG. 3 is indicated as $t_1$.

Figure 3A:
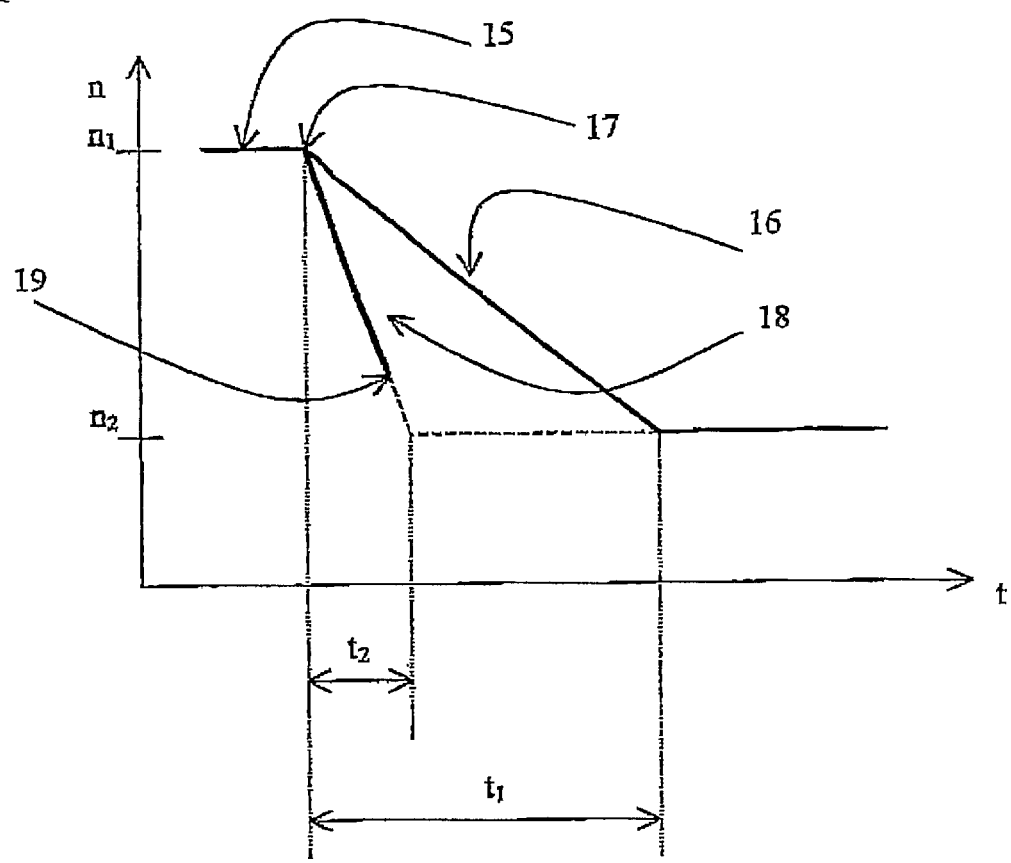

If, however, an additional engine brake (for example compression brake) is utilized, the rpm n of the engine will decrease considerably much quicker from the first rpm $n_1$ to the second rpm $n_2$ than is the case without engine braking. This relatively quick process is indicated in FIG. 3a with reference numeral 18. In more detail, the engine braking is then terminated at a point in time before the desired rpm $n_2$ has been obtained as indicated with reference numeral 19, since the effect of the engine braking will remain for a short moment after it has been turned off. In conclusion, the second rpm $n_2$ is reached in a certain period of time $t_2$ which is considerably much shorter than the corresponding period of time ($t_1$) during which no engine braking is used.

Apart from the desire for a short power cut-off time, PCOT, in the driving of the engine it is also desirable to have as few malfunctions as possible take place in connection with a gear-shift. For example, too long a cut-off time can cause unnecessary expenditure of time after an otherwise rapid gear-shift up to the point in time when engine torque is re-engaged. A very long cut-off time can even in some cases make a desired gear-shift impossible.

Before a gear-shift, a value of an expected speed derivative $ESG_e$ (expected engine speed gradient) is used for the decrease of the engine speed during the gear-shift. A value regarding this expected speed derivative $ESG_e$ is then stored in a (not shown) control unit which according to that which has been explained above is utilized in the control of a certain gear-shift process. It is a basic principle behind the invention that the measurement of the actual speed derivative $ESG_m$ (measure engine speed gradient) of the engine is carried out during the gear-shifting process and if the latter measured derivative deviates too much from the expected derivative—causes an updating of the stored value regarding the expected derivative.

Figure 3B:
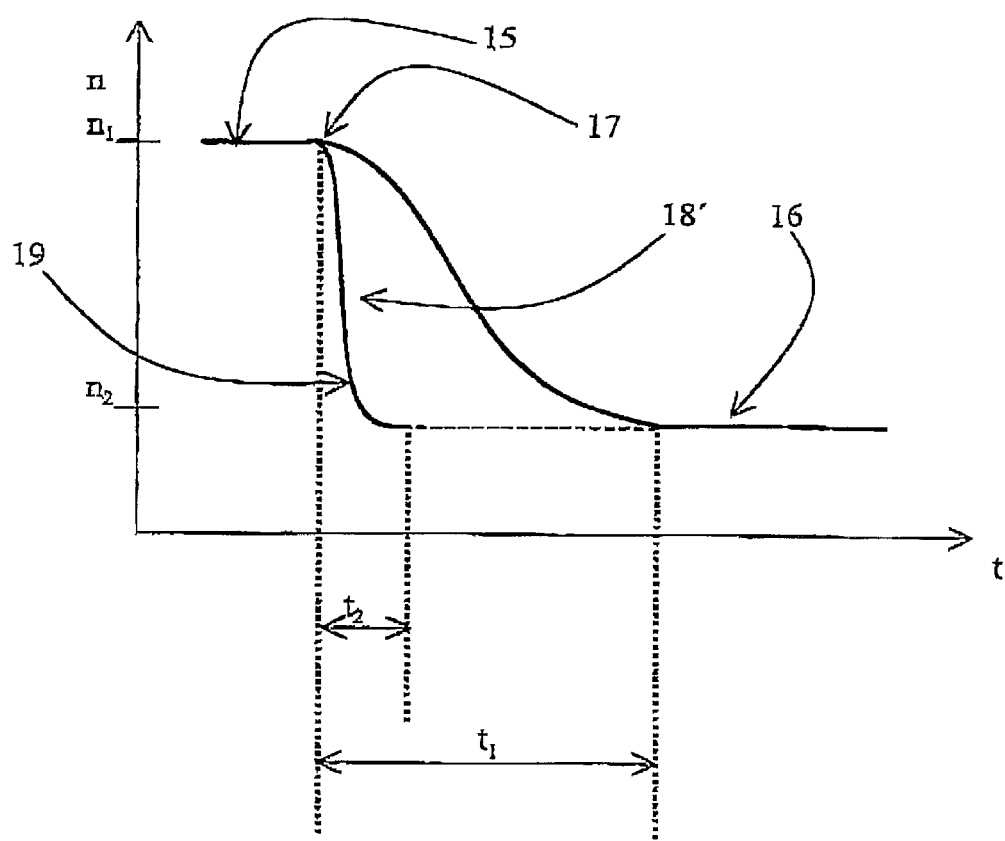

In the process of FIG. 3a, the rpm n of the engine falls from the first rpm $n_1$ to the second rpm $n_2$ in an essentially linear manner, i.e. as can be seen from reference numeral 18. In FIG. 3b, the connection is shown between time t (the x-axis) and the rpm n of an engine (the y axis) in an alternate process, which essentially corresponds to that shown in FIG. 3a, but in which the rpm n of the engine does not fall linearly from the first $n_1$ to the second rpm $n_2$ but is instead varied during the gear-shifting process. This is shown with the reference numeral 18" in FIG. 3b. From this it can be seen that the transition between a first driving position 15 and a second driving condition 16 can take place in a number of ways. The measurement according to the invention of the speed derivative of the engine has as its primary purpose to estimate the average speed gradients (i.e. the average speed decrease of the engine rpm) between a starting and a finishing point. The starting point then corresponds to the initiation of a gear-shifting process, and the finishing point corresponds to the engine having reached its desired rpm, and the gear-shift can be completed.

Figure 4:
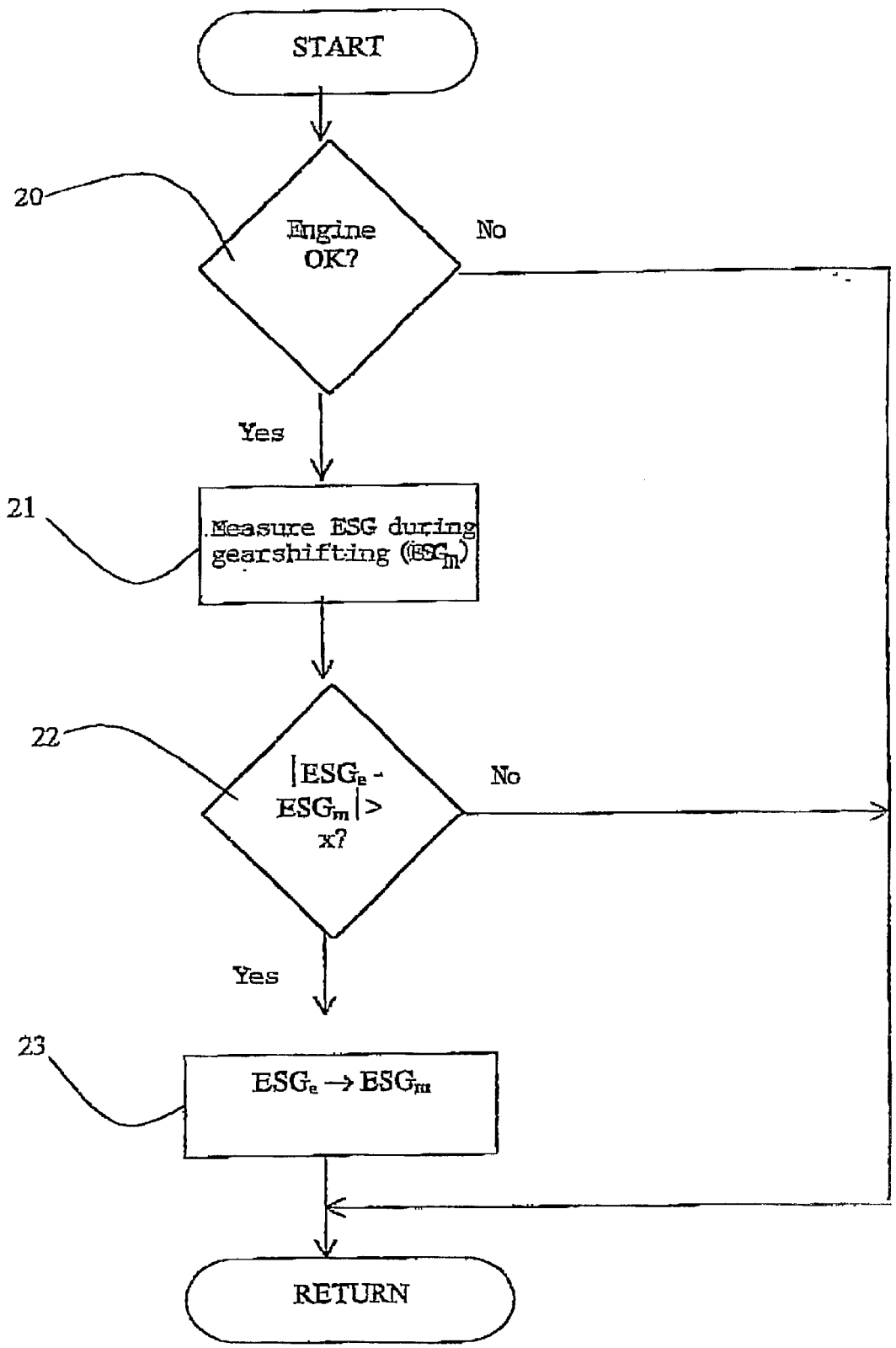
FIG. 4 is a flowchart which describes the function of the invention during engine braking in connection to gear-shifting.

The process according to the invention will now be described in detail with reference to FIG. 4, which is a simplified flowchart which illustrates how the invention is utilized when shifting gear. The gear-shifting is initiated in a way which has been mentioned previously, by a signal from a control unit activating a control valve of, for example, the kind which has been described above. As is indicated in block 20 in FIG. 4, the gear-shifting process is then initiated with a control function to make sure that the engine in question has the correct temperature and is otherwise also in a condition which permits gear-shifting using the added engine brake. It is here assumed that the gear-shifting process is intended to take place with an expected rate of decrease for the rpm of the engine, i.e. a unexpected speed derivative $ESG_e$. A value according to this speed derivative is thus stored in the control unit. If the function of the engine is judged to be good the gear-shift will be initiated. The choice of gear-shifting process (for example between which gears shifting is to be carried out) can be determined by means of determining the power cut-off time (PCOT). The PCOT is determined using as a starting point the expected speed derivative $ESG_e$. Depending on the length of the power cut-off time, it is determined between which gears an attempted gear-shift should be carried out. Alternatively, other factors such as, for example, the current gear of the gearbox, the weight of the vehicle, the characteristics of the engine, the slope of the road and the position of the gas pedal can influence the gear-shifting process. For example, during up-shifting at a relatively high rpm in a steep upwards slope, the gear-shifting can be carried out with one or two gear steps depending on the power cut-off time.

During the gear-shifting process, a measurement takes place of the actual speed derivative $ESG_m$ (block 21). This measurement, which corresponds to a calculation of $ESG_m = \Delta rpm/\Delta t$), results in an actual value regarding a measured speed derivative $ESG_m$, i.e. the "total" derivative during the power cut-off in question. This value can also be said to correspond to an average speed gradient between a starting point and a finishing point, with the starting point in turn corresponding to an initiation of the gear-shifting process, and the finishing point in time corresponds to the engine having reached the desired rpm and the gear-shift can be completed. If, for example, the measured speed derivative $ESG_m$ is relatively low, it can be seen that a reduced engine brake effect is present. This affects the possibilities of carrying out the gear-shift in process in question without problems.

Following this (block 22), a comparison takes place between the measured speed derivative $ESG_m$, and the expected speed derivative $ESG_e$. If the absolute value of the difference between the measured speed derivative $ESG_m$ and the speed derivative $ESG_e$ exceeds a predetermined threshold value x, an adaptation or updating of the value of the expected speed derivative $ESG_e$ takes place according to the invention. This in turn takes place by storing in the stored unit a new value regarding the expected speed derivative $ESG_e$ (block 23). The value of the measured speed derivative $ESG_m$ can then either directly be replaced by the previous expected speed derivative $ESG_e$, or the latter parameter can gradually or successively be changed (over a certain period of time) so that it finally reaches a value which corresponds to the measured speed derivative $ESG_m$.

The above-mentioned threshold value x is set at a suitable level, and is, for example, in the order of size of 10% of the value of the expected speed derivative $ESG_e$. The invention is however not limited only to this value.

If a successive change of the value of the expected speed derivative $ESG_e$ takes place, this can be done in the shape of a stepwise increase from the value of the previous expected speed derivative $ESG_e$, up to the value of the measured speed derivative $ESG_m$ during a certain period of time. As an alternative to a stepwise increase, there can also be, for example, an exponential increase up to the value which corresponds to the measured speed derivative $ESG_m$. For example, the adaptation can be done so that a new "adapted" value consists of the sum of 90% of the previous value, and 10% of the measured value. As a further alternative, the increase can take place according to a transient process in which the previous value of the expected speed derivative $ESG_e$ first increases in time to a value which even exceeds the measured speed derivative $ESG_m$, but which during a certain amount of time "adapts to" a value which corresponds to the measured speed derivative $ESG_m$. The adaptation can also be based on, for example, an average value of a number of measured speed derivatives (for example during the last five gearshifts) constituting the basis of a new expected value $ESG_e$. Regardless of which change or transient process which is used, the previous value of the expected speed derivative $ESG_e$ will finally have been replaced with a value which corresponds to previously measured values regarding the speed derivative.

When the value of the expected speed derivative $ESG_e$ has been replaced with a new adapted value according to the above, the process is terminated. Before the next gearshift, a new value regarding the expected speed derivative $ESG_e$ will be utilized when the gearshift is initiated. This new value is then adapted to that which has taken place during the previous gearshift. Since the system in this way takes into consideration earlier events in connection with gear-shifting, the risk of possible mistakes and imperfections (for example too early or too late gearshifts, poor driving conditions, incomplete gearshifts etc) in connection with gearshifting can gradually decrease and perhaps even be eliminated.

In normal cases, the above described process (see also FIG. 4) will have been repeated during approximately 5–15 minutes of driving with an amount of gearshifts before the adaptation has led up to a well functioning value of the expected speed derivative $ESG_e$. This will then be well adapted to the engine arrangement in question. The obtained value can be stored in a storage unit and constitute a starting value when next driving the vehicle, but this is not always necessary.

The invention is not limited to the above-described embodiment, but can be varied within the scope of the appended claims. For example, the invention can be utilized in various types of vehicles, for example trucks and passenger cars. Additionally, the invention can be utilized in various kinds of engine braking devices, that is in other devices than the above-described compression brake device. In more detail, the invention can be utilized in those engine braking devices in which a measurement of the speed derivative of the engine (engine speed gradient) can be obtained. For example, the invention can be utilized in applications where electrical or hydraulic primary actuators are utilized. Also, the invention can be utilized in so-called ISG arrangements, i.e. arrangements with an integrated starting engine and generator which can be utilized to obtain a breaking effect.

What is claimed is:

1. Method for up-shifting of an automatic or semiautomatic gearbox which is connected to an engine equipped with an additional engine brake, which method comprises determining an expected value of the speed derivative ($ESG_e$) of said engine during said gearshift, wherein said method comprises:

measuring the speed derivative ($ESG_m$) of the engine during said gearshifting (21), calculating a difference value which corresponds to the difference between the measured value of the speed derivative ($ESG_m$) and the expected value of the speed derivative ($ESG_e$), and updating the expected value of the speed derivative ($ESG_e$) to a new value which closely core responds to said measured value of the speed derivative ($ESG_m$) if said difference value exceeds a predetermined threshold value (x).

2. Method according to claim 1, wherein said updating is carried out by replacing said expected value of the speed derivative ($ESG_e$) by said measured valued of the speed derivative ($ESG_m$) directly after said calculation.

3. Method according to claim 1, wherein said updating is carried out by means of a successive change of said expected value of the speed derivative ($ESG_e$) in the direction of a value which corresponds to said measured value of the speed derivative ($ESG_m$).

4. Method according to claim 3, wherein said successive change takes place stepwise.

5. Method according to claim 3, wherein said successive change takes place continuously.

6. Method according to claim 3, wherein said successive change takes place by replacing said expected value of the speed derivative ($ESG_e$) with a value that corresponds to an average value of a previously determined number of values of the measured speed derivative ($ESG_m$).

7. Method according to claim 1, wherein it comprises compression braking using said additional engine brake.

8. Device for up-shifting of an automatic or semiautomatic gearbox which is connected to an engine equipped with an additional engine brake, comprising a control unit for initiating gearshifting and for storing an expected value of the speed derivative ($ESG_e$) of said engine during said gearshifting, wherein said device comprises means for measuring the speed derivative ($ESG_m$) of the engine during said gearshifting (21), with said control unit being adapted to calculate a difference value which corresponds to the difference between the measured value of the speed derivative ($ESG_m$) and the expected value of the speed derivative ($ESG_e$), and for updating the expected value of the speed derivative ($ESG_e$) to a new value which corresponds to said measured value of the speed derivative ($ESG_m$) if said difference value exceeds a predetermined threshold value (x).

9. Device according to claim 8, wherein said control unit is arranged to initiate compression braking of said engine.

* * * * *